United States Patent [19]

Crivello

[11] 4,336,363

[45] * Jun. 22, 1982

[54] HEAT CURABLE COMPOSITIONS CONTAINING SULFONIUM SALTS

[75] Inventor: James V. Crivello, Clifton Park, N.Y.

[73] Assignee: General Electric Company, Schenectady, N.Y.

[*] Notice: The portion of the term of this patent subsequent to Oct. 28, 1997, has been disclaimed.

[21] Appl. No.: 195,322

[22] Filed: Oct. 9, 1980

Related U.S. Application Data

[63] Continuation-in-part of Ser. No. 11,102, Feb. 12, 1979, Pat. No. 4,230,814.

[51] Int. Cl.$^3$ .................... G03C 1/68; C08F 16/12
[52] U.S. Cl. ........................ 526/333; 204/159.18; 204/159.24; 430/280; 526/192; 526/222; 528/14; 528/55; 528/90; 528/139
[58] Field of Search ............... 430/280, 270, 281; 204/159.18, 159.24; 526/426, 222, 333, 335; 528/139, 14, 90, 55

[56] References Cited

U.S. PATENT DOCUMENTS

| | | | |
|---|---|---|---|
| 3,412,046 | 11/1968 | Payne | 260/2 |
| 4,058,400 | 11/1977 | Crivello | 204/159.23 |
| 4,058,401 | 11/1977 | Crivello | 204/159.23 |
| 4,108,747 | 8/1978 | Crivello | 204/159.24 |
| 4,230,814 | 10/1980 | Crivello | 204/159.24 |

*Primary Examiner*—Jack P. Brammer
*Attorney, Agent, or Firm*—William A. Teoli; James C. Davis, Jr.

[57] ABSTRACT

Heat curable compositions are provided comprising cationically polymerizable organic materials such as epoxy resins, vinyl ethers or phenol formaldehyde resins and thermal curing agents, based on the use of certain aryl sulfonium salts with an organic oxidant, such as an organic peroxide, azonitriles, etc. The heat curable compositions can be used as injection molding compounds or as a coating composition.

10 Claims, No Drawings

HEAT CURABLE COMPOSITIONS CONTAINING SULFONIUM SALTS

CROSS REFERENCE TO RELATED APPLICATIONS

This application is a continuation-in-part of copending application Ser. No. 11,102, filed Feb. 12, 1979 now U.S. Pat. No. 4,230,814. Related applications are Ser. No. 11,101, for Curable Organic Resin Compositions, Foaming Method and Organic Foams, filed Feb. 12, 1979, now U.S. Pat. No. 4,241,204 Ser. No. 962,997 filed Nov. 22, 1978, now abandoned, for Curable Organic Resin Compositions and Foaming Method, which is a continuation-in-part of Ser. no. 861,127, filed Dec. 16, 1977, now abandoned, for Curable Organic Resin Compositions and Foaming Method, U.S. Pat. No. 4,173,551, for Heat Curable Compositions, which is a continuation-in-part of Ser. No. 781,785, filed Mar. 28, 1977, for Heat Curable Epoxy Compositions and Method for Curing Same, now abandoned, U.S. Pat. No. 4,216,288, for Heat Curable Compositions and Method for Curing Same which is a continuation-in-part of application Ser. No. 841,351, filed Oct. 12, 1977, now abandoned, for Heat Curable Compositions, which is a continuation-in-part of Ser. No. 689,247, filed May 24, 1976, for Epoxy Compositions and Method of Curing Same, now abandoned, where all of the aforesaid applications are assigned to the same assignee as the present invention.

BACKGROUND OF THE INVENTION

The present invention relates to heat curable compositions comprising a cationically polymerizable organic material, for example, an epoxy resin, a dialkyl hydroxyarylsulfonium salt and an organic oxidant.

As shown in my U.S. Pat. No. 4,216,288, organic resins, for example, epoxy resins can be thermally cured by using an effective amount of an aromatic onium salt such as an aryl iodonium salt and a reducing agent, for example, a thiophenol. The present invention is based on the discovery that such organic resin also can be thermally cured with an organic oxidant, such as an organic peroxide in combination with an effective amount of certain hydroxyaryldialkyl sulfonium salts, for example,

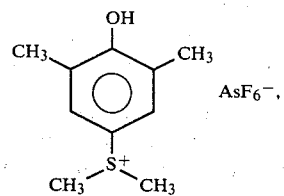

dimethyl-4-hydroxy-3,5-dimethylphenyl sulfonium hexafluoroarsenate.

STATEMENT OF THE INVENTION

There is provided by the present invention, heat curable compositions comprising
(A) a cationically polymerizable organic material,
(B) an effective amount of a thermal curing agent consisting essentially of an organic oxidant and a dialkyl hydroxyarylsulfonium salt.

Included by the dialkylhydroxyarylsulfonium salts which can be used in the practice of the present invention are compounds having the formula, $$[R(R^1)_aS]^+[Y]^-, \qquad (1)$$

where R is a $C_{(6-20)}$ aromatic radical having from 1 to 3 nuclearly bonded hydroxy radicals, $R^1$ can be the same or different $C_{(1-8)}$ alkyl radical or an alkylene radical capable of forming a cycloaliphatic or heterocyclic ring, Y is a non-nucleophilic anion, a is an integer equal to 1 or 2, and when $R^1$ is alkyl, a is 2, and when $R^1$ is alkylene, a is 1.

Radicals included by R of formula (1) are, for example,

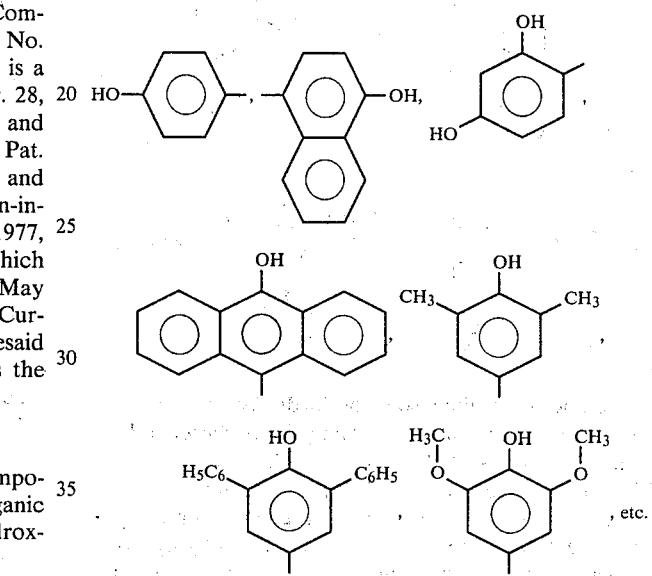

$R^1$ radicals include $CH_3-$, $-C_4H_9-$, $C_2H_5-$, $CH_3O-$, $(CH_3)_3C-$, $C_6H_5CH_2-$, $-(CH_2)_4-$, $-(CH_2)_5-$, $-CH_2-CH_2-O-CH_2-CH_2-$, $-CH_2-CH_2-S-CH_2-CH_2-$, etc.

Preferably, the salts included by formula (1), are

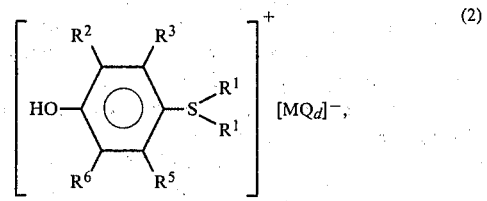

where $R^1$, M, Q and d are as previously defined, and $R^2-R^6$ are monovalent radicals selected from hydrogen, $C_{(1-8)}$ alkyl, $C_{(1-8)}$ alkoxy, nitro, chloro, etc.

Dialkyl hydroxyphenylsulfonium salts included by formulas (1) and (2) are,

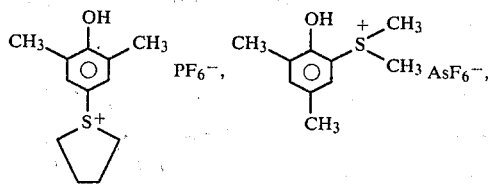

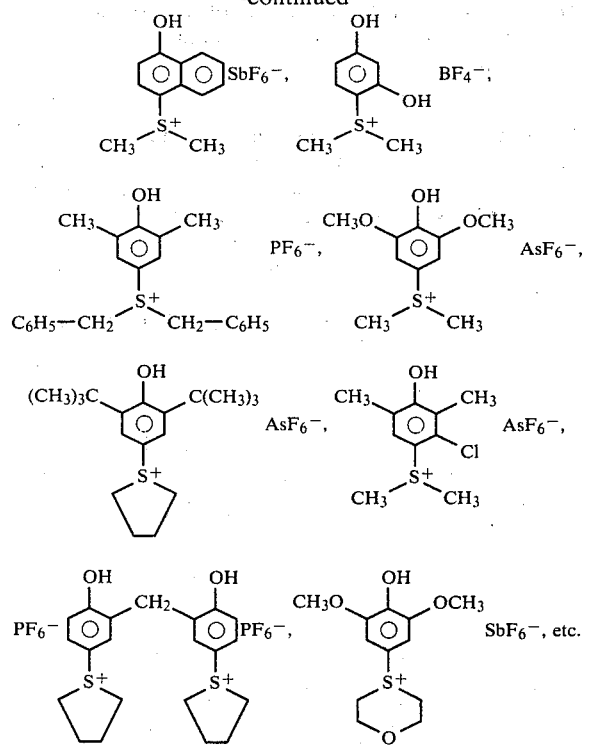

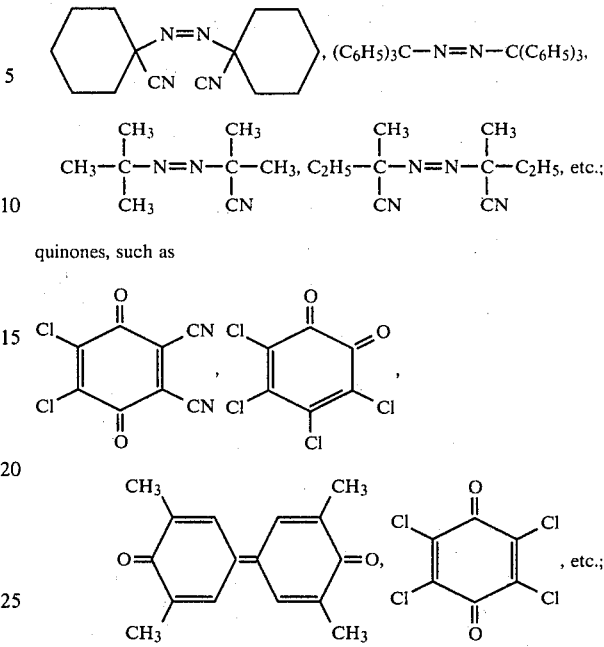

Methods for making some of the dialkyl hydroxy aryl sulfonium salts of formulas (1) and (2) are shown in U.S. Pat. Nos. 4,058,400, 4,058,401 and 4,161,478 and Ser. No. 954,196, filed Oct. 24, 1978, now abandoned.

Organic oxidants which can be used in the practice of the invention incombination with the dialkylhydroxy arylsulfonium salts of formulas 1 and 2 to effect the cure of the cationically polymerizable organic material are, for example, organic peroxides such as ketone peroxides, peroxy acids, dibasic acid peroxides, aldehyde peroxides, alkyl peroxides, hydroperoxides, alkyl peroxyesters, diperoxide derivatives, for example, t-butyl peroxypivalate, 2,4-dichlorobenzoyl peroxide, caprylyl peroxide, lauroyl peroxide, decanoyl peroxide, propionyl peroxide, acetyl peroxide, t-butyl peroxyisobutyrate, p-chlorobenzoyl peroxide, benzoyl peroxide, hydroxyheptyl peroxide, cyclohexanone peroxides, 2,5-dimethylhexyl-2,5-di(peroxybenzoate), di-t-butyl diperphthalate, t-butyl peracetate, t-butyl-perbenzoate, dicumyl peroxide, 2,5-dimethyl-2,5-di(t-butyl-peroxy)-hexane, t-butyl hydroperoxide, di-t-butyl peroxide, methyl ethyl ketone peroxide, p-methane hydroperoxide, cumene hydroperoxide, 2,5-dimethylhexyl-2,5-dihydroperoxide, t-butyl hydroperoxide, peracetic acid, perbenzoic acid, m-chloroperbenzoic acid, etc.

In addition to organic peroxides, organic oxidants which also can be used in the practice of the invention include azo-bis alkyl nitriles and other azo compounds, such as

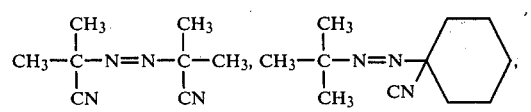

iodoso aromatic compounds, such as iodosobenzene, 4-nitroiodosobenzene, iodosobenzene diacetate, 4,chloroiodosobenzene, 4-methoxyiodosobenzene, 4-iodosobiphenyl, 2-chloroiodosobenzene diacetate, etc.

Cationically polymerizable organic materials which can be used to make the heat curable compositions of the present invention include epoxy resins, thermosetting organic condensation resins of formaldehyde, vinyl organic prepolymers, cyclic ethers, etc.

The term "epoxy resin" as utilized in the description of the cationically polymerizable compositions of the present invention, includes any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or by the reaction of low molecular weight phenol formaldehyde resin (Novolak resin) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxy-polyesters. Such polymers usually have epoxy functional groups at the ends of their chains. Epoxy-siloxane resins and method for making are more particularly shown by E. P. Pleuddemann and G. Fanger, J. Am. Chem. Soc. 802632-5 (1959). As described in the literature, epoxy resins can also be modified in a number of standard ways such as reaction with amines, carboxylic acids, thiols, phenols, alcohols, etc., as shown in U.S. Pat. Nos. 2,935,488; 3,235,620; 3,369,055; 3,379,653; 3,398,211, 3,403,199; 3,563,840; 3,567,797; 3,677,995; etc. Further coreactants which can be used with epoxy resins are hydroxy terminated flexibilizers such as hydroxyl terminated polyethers, hydroxy terminated polyesters, etc., shown in the Encyclopedia of Polymer Science and Technology, Vol. 6, 1967, Interscience Publishers, New York, pp. 209-271 and particularly p. 238.

Included by the thermosetting organic condensation resins of formaldehyde which can be used in the practice of the present invention are, for example, urea type resins, such as

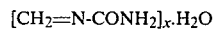

phenol-formaldehyde type resin, such as

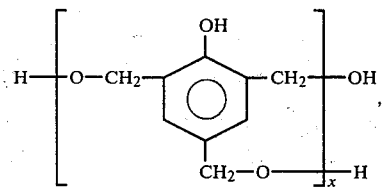

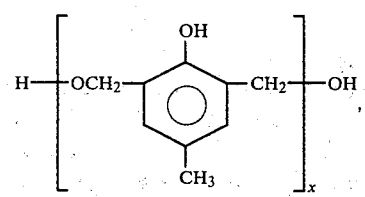

where x and n are integers having a value of 1 or greater;

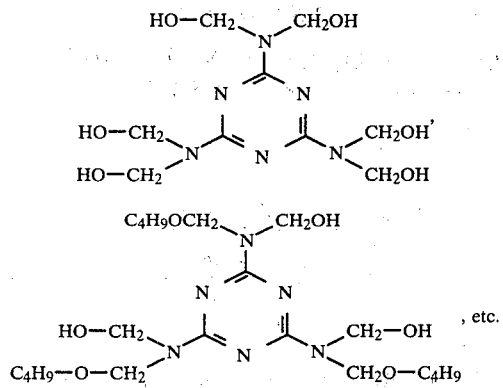

alkoxy silanes having the formula,

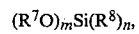

where $R^7$ is a $C_{(1-7)}$ alkyl radical, $R^8$ is selected from $R^7$ radicals and $C_{(6-13)}$ aryl radicals and halogenated derivatives, m is an integer equal to 1 to 4, n is an integer equal to 0 to 3 inclusive and m+n is equal to 4.

In addition, there can be used melamine thiourea resins, melamine, or urea aldehyde resins, cresol-formaldehyde resins and combinations with other carboxy, hydroxyl, amino and mercapto containing resins, such as polyesters, alkyds and polysulfides.

Some of the vinyl organic prepolymers which can be used to make the polymerizable compositions of the present invention are, for example, $C_2=CH-O-(CH_2-CH_2O)_{n'}-CH=CH_2$, where n' is a positive integer having a value up to about 1000 or higher; multifunctional vinylethers, such as 1,2,3-propane trivinylether, trimethylolpropane trivinylether, prepolymers having the formula,

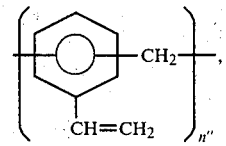

and low molecular weight polybutadiene having a viscosity of from 200 to 10,000 centipoises at 25° C., etc. Products resulting from the cure of such compositions can be used as printing inks and other applications typical of thermosetting resins.

A further category of the organic materials which can be used to make the polymerizable compositions are cyclic ethers which are convertible to thermoplastics. Included by such cyclic ethers are, for example, oxetanes such as 3,3-bis-chloromethyloxetane, alkoxyoxetanes as shown by Schroeter U.S. Pat. No. 3,673,216, assigned to the same assignee as the present invention; oxolanes such as tetrahydrofuran, oxepanes, oxygen containing spiro compounds, trioxane, dioxolane, etc.

In addition to cyclic ethers there are also included cyclic esters such as β-lactones, for example propiolactone, cyclic amines, such as 1,3,3-trimethyl-azetidine and organosilicone cyclics, for example, materials included by the formula,

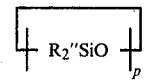

where R'' can be the same or different monovalent organic radical such as methyl or phenyl and p is an integer equal to 3 to 8 inclusive. An example of an organosilicon cyclic is hexamethyl trisiloxane, octamethyl tetrasiloxane, etc. The products made in accordance with the present invention are high molecular weight oils and gums.

The heat curable compositions of the present invention can be made by blending the cationically polymerizable organic material with an effective amount of the thermal curing agent. There can be used 0.1 to 10 percent by weight of the dialkyl hydroxyarylsulfonium salt based on the weight of cationically polymerizable organic material. With respect to the combination of organic oxidant and dialkylhydroxyarylsulfonium salt, there can be used from 1 to 100 parts of organic oxidant, per part of dialkyl hydroxy arylsulfonium salt.

The resulting curable composition can be in the form of a varnish having a viscosity of from 1 to 100,000 centipoises at 25° C. or a free flowing powder, depending upon the nature of the cationically polymerizable organic material. The curable compositions can be applied to a variety of substrates by conventional means and cured to the tack-free state within 0.5 to 20 minutes, depending upon the temperature employed.

In certain instances, an organic solvent, such as nitromethane, acetonitrile, can be used to facilitate the mixing of various ingredients. The dialkyl hydroxy arylsulfonium salts can be formed in situ if desired. In addition, the curable compositions may contain inactive ingredients, such as silica, talc, clay, glass fibers, extenders, hydrated alumina, carbon fiber process aids, etc., in amounts of up to 500 parts of filler per 100 parts of cationically polymerizable organic material. The curable compositions can be applied to such substrates as metal, rubber, plastic, molded parts or films, paper, wood, glass, cloth, concrete, ceramic, etc.

Some of the applications in which the curable compositions of the present invention can be used are, for example, protective, decorative and insulating coatings, potting compounds, printing inks, sealants, adhesives, molding compounds, wire insulation, textile coatings, laminates, impregnated tapes, varnishes, etc.

In order that those skilled in the art will be better able to practice the invention, the following examples are given by way of illustration and not by way of limitation. All parts are by weight.

EXAMPLE 1

A mixture of three parts of dimethyl-4-hydroxy-3,5-dimethoxyphenyl sulfonium hexafluoroarsenate, three parts of benzoylperoxide and 94 parts of Shell Epon 828, a diglycidyl ether of bisphenol-A, was stirred and heated to 160° C. The mixture gelled and hardened within 2.5 minutes.

EXAMPLE 2

The procedure of Example 1 was repeated, except that Celanese SU8, epoxy novolak resin was substituted for the diglycidyl ether bisphenol-A epoxy resin. The resulting heat curable composition required eight minutes to harden at 120° C.

EXAMPLE 3

A series of mixtures were prepared utilizing 100 parts of 3,4-epoxycyclohexylmethyl-3,4-epoxy cyclohexane carboxylate, 3 parts of a hexafluoroantimonate salt of the formula,

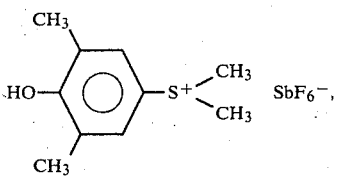

and 3 parts of various organic oxidants. The mixtures were then heated to 130° C. to determine gel times. The following results were obtained:

| Organic oxidant | Gel Time |
| --- | --- |
| None | >7 min. |
| benzoyl peroxide | 1 min., 30 sec. |
| cumene hydroperoxide | 2 min., 50 sec. |
| 2,3-dichloro-5,6-dicyano-quinone | 40 sec. |
| azo-bisisobutyronitrile | 6 min. 15 sec. |
| lauroyl peroxide | 4 min. 5 sec. |

EXAMPLE 4

In accordance with the procedure of Example 3, heat curable mixtures were prepared utilizing 100 parts of ERL 4221 (3,4-epoxycyclohexylmethyl-3,4-epoxycyclohexane carboxylate), 3 parts of

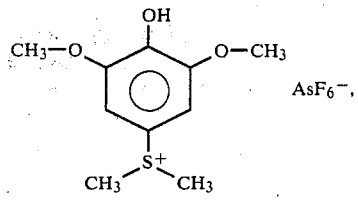

and 3 parts of various organic oxidants. The mixtures were heated to 150° C. to determine when the mixtures changed from a fluid condition to the solid cured state. The following results were obtained:

| Organic oxidant | Gel Time |
| --- | --- |
| None | 25 min. |
| methylethyl ketone peroxide | 11 min. |
| t-butyl hydroperoxide | 3 min. |

EXAMPLE 5

A mixture composed of 100 parts of 1,4-butanediol diglycidyl ether, 3 parts of t-butyl hydroperoxide and 3 parts of dimethyl-3,5-dimethoxy-4-hydroxyphenylsulfonium hexafluoroarsenate was heated at 150° C. The mixture cured to a hard crosslinked resin after 18 minutes. The same mixture free of the t-butyl hydroperoxide did not gel after it was heated for 60 minutes at 140° C.

EXAMPLE 6

Mixtures were prepared having 100 parts of diethyleneglycol divinyl ether and 3 parts of

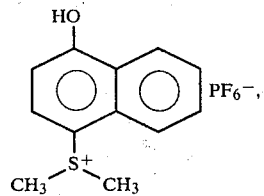

There was added 3 parts of t-butyl hydroperoxide to one of the mixtures. Both mixtures were thoroughly stirred and then heated to 140° C. The mixture containing the peroxide cured after 5 minutes, while the mixture free of peroxide required 15 minutes to cure to a tack-free condition.

EXAMPLE 7

Mixtures of 100 parts of Methylon ® resin (a phenol-formaldehyde resole of the General Electric Company) and 3 parts of

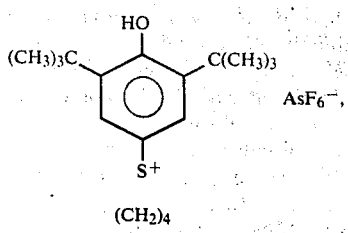

were thoroughly stirred. There was added 3 parts of t-butyl hydroperoxide to one of the mixtures. The mixtures were then heated at 150° C. The mixture having the t-butyl hydroperoxide cured to a hard crosslinked insoluble resin. The mixture free of the organic oxidant remained substantially unchanged.

In addition to aryl sulfonium salts of formula (1), I have found that additional arylsulfonium salts also can be utilized in the practice of the present invention to effect the heat cure of cationically polymerizable organic material when used in combination with an organic oxidant, such as an organic peroxide as defined above. These arylsulfonium salts are included within the formula, $$(R^7)_3 SMQ_d,\qquad(3)$$

where $R^7$ is a $C_{(6-13)}$ aromatic organic radical, for example, phenyl and halogenated derivatives thereof, or where such arylsulfonium salts are included within the formula, $$[R^8C\text{—}R^9](R^{10})_2SMQ_d,\qquad(4)$$

where $R^8$ is selected from $R^7$ radicals, $R^9$ is selected from $C_{(2-8)}$ alkylene radicals and $R^{10}$ is selected from $C_{(1-8)}$ alkyl radicals, for example, methyl, ethyl, propyl, butyl, etc., and $MQ_d$ is as previously defined.

Included within the arylsulfonium salts of formulas (3) and (4) are, for example,

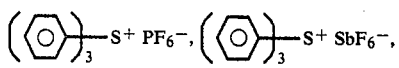

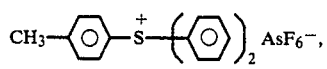

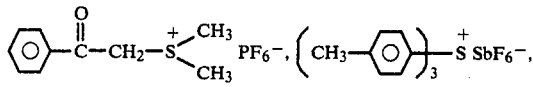

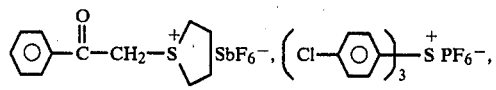

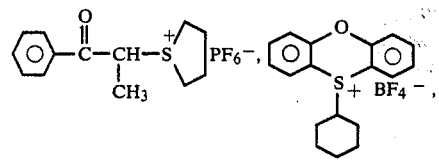

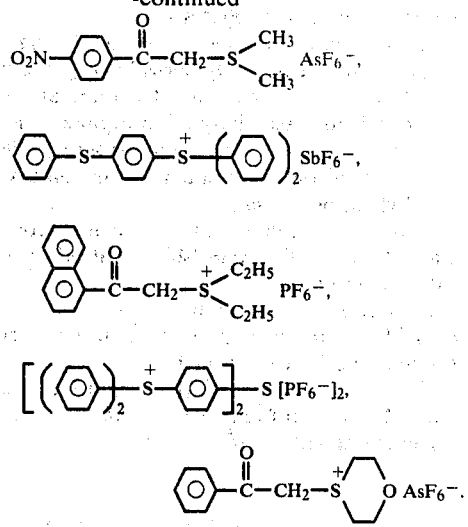

Methods for making some of the arylsulfonium salts of formulas (3) and (4) are shown in U.S. Pat. Nos. 4,058,400, 4,058,401 and in U.S. Pat. No. 4,161,478, assigned to the same assignee as the present invention.

The curable compositions of the present invention can be made in accordance with the procedures described in making the heat curable compositions utilizing dialkyl hydroxy aryl sulfonium salts of formula (1).

EXAMPLE 8

To a mixture of 94 parts of Ciba Geigy CY 179 and 3 parts by weight of

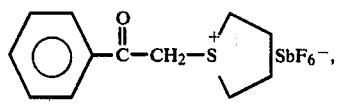

there was added 3 parts of an organic peroxide. The mixture was heated to 130° C. The following gel times were measured:

| Peroxide | Gel (cure) time (min) |
|---|---|
| — | >6.5 min |
| dicumyl peroxide | 4.5 min |
| cumene hydroperoxide | 3.5 min |
| lauroyl peroxide | 4.1 min |
| azobisisobutyronitrile | 6.5 min |
| benzoyl peroxide | 1.5 min |

EXAMPLE 9

A mixture composed of 95 parts Epon 828, 2 parts triphenylsulfonium hexafluoroantimonate and 3 parts benzoyl peroxide were heated rapidly (at 20° per minute) from 25° C. to 300° C. During the heating period, cure was observed by recording the heat of polymerization using a differential scanning calorimeter. When the peroxide was omitted, no heat or cure was observed.

Although the above examples are directed to only a few of the very many heat curable compositions included by the present invention, it should be understood that the present invention includes a much broader class of heat curable materials as shown by the description preceding these examples.

What I claim as new and desire to secure by Letters Patent of the United States is:

1. Heat curable compositions comprising
   (A) a cationically polymerizable organic material
   (B) an effective amount of a thermal curing agent consisting essentially of an organic oxidant and an aryl sulfonium salt selected from the class consisting of a triarylsulfonium salt and an aryl acyl dialkyl sulfonium salt.

2. A heat curable composition in accordance with claim 1, where the triarylsulfonium salt is a triphenylsulfonium salt.

3. A heat curable composition in accordance with claim 1, where the triarylsulfonium salt is triphenylsulfonium hexafluoro phosphate.

4. A heat curable composition in accordance with claim 1, wherein the aryl acyl dialkyl sulfonium salt is phenacyl dimethylsulfonium salt.

5. A heat curable composition in accordance with claim 1, where the aryl acyl dialkyl sulfonium salt is a phenacyl dimethylhexafluorophosphate.

6. A heat curable composition in accordance with claim 1, wherein the cationically polymerizable organic material is an epoxy resin.

7. A heat curable composition in accordance with claim 1, where the cationically polymerizable organic material is a vinyl ether.

8. A heat curable composition in accordance with claim 1, where the cationically polymerizable organic material is a phenol formaldehyde resin.

9. A heat curable composition in accordance with claim 1, wherein the organic oxidant is an organic peroxide.

10. A heat curable composition in accordance with claim 1, where the organic oxidant is benzoylperoxide.

* * * * *